United States Patent
Othmer

(10) Patent No.: US 7,580,702 B2
(45) Date of Patent: *Aug. 25, 2009

(54) SYSTEMS AND METHODS FOR DISCOVERING FEATURES IN A COMMUNICATION DEVICE

(75) Inventor: Konstantin Othmer, Mountain View, CA (US)

(73) Assignee: Core Mobility, Inc., Mountain View, CA (US)

( * ) Notice: Subject to any disclaimer, the term of this patent is extended or adjusted under 35 U.S.C. 154(b) by 616 days.

This patent is subject to a terminal disclaimer.

(21) Appl. No.: 11/129,152

(22) Filed: May 13, 2005

(65) Prior Publication Data

US 2006/0259613 A1 Nov. 16, 2006

(51) Int. Cl.
*H04M 1/663* (2006.01)

(52) U.S. Cl. .............. 455/412.2; 455/550.1; 455/566; 379/88.11; 379/88.12; 725/42; 725/43; 715/781

(58) Field of Classification Search .......... 455/566, 455/414.2, 414, 1, 414.3, 424, 425, 456.5, 455/456.6, 412.1, 418–420, 186.1, 557, 414.1, 455/550.1, 575.1, 67.7, 412.2, 561, 416, 455/413; 379/207.04, 207.02, 201.01–201.05, 379/142.01, 142.06, 114.07, 88.11, 88.12; 370/259, 215; 345/810; 709/224; 348/563, 348/565; 725/110, 112, 43, 42, 47, 40, 9, 725/10, 12, 13–21; 715/781, 774, 783, 784, 715/780

See application file for complete search history.

(56) References Cited

U.S. PATENT DOCUMENTS

| | | | |
|---|---|---|---|
| 6,560,576 B1 * | 5/2003 | Cohen et al. ................. | 704/270 |
| 6,856,330 B1 | 2/2005 | Chew et al. | |
| 2002/0059594 A1 * | 5/2002 | Rasmussen et al. ........... | 725/37 |
| 2002/0070976 A1 * | 6/2002 | Tanner et al. ................ | 345/810 |
| 2002/0078182 A1 | 6/2002 | Barillaud et al. | |
| 2003/0171148 A1 * | 9/2003 | Weitz .......................... | 463/40 |
| 2004/0041849 A1 | 3/2004 | Mock et al. | |
| 2005/0050117 A1 | 3/2005 | Seo et al. | |
| 2005/0159141 A1 * | 7/2005 | Osborn, Jr. ................ | 455/414.2 |
| 2005/0260996 A1 | 11/2005 | Groenendaal | |
| 2005/0283285 A1 | 12/2005 | Ying | |
| 2006/0026088 A1 * | 2/2006 | Grossman et al. ............. | 705/37 |
| 2006/0050860 A1 * | 3/2006 | Baker ..................... | 379/207.04 |
| 2007/0022154 A1 | 1/2007 | Saunders et al. | |
| 2007/0286099 A1 * | 12/2007 | Stocklein et al. ............ | 370/259 |

* cited by examiner

*Primary Examiner*—Duc Nguyen
*Assistant Examiner*—Charles Chow
(74) *Attorney, Agent, or Firm*—Workman Nydegger

(57) ABSTRACT

Systems and methods for discovering features of a communication device. The features of a communications device are tracked or monitored. Features that are unused or undiscovered are identified. The undiscovered features are then included as ticker items in an interactive ticker. When a ticker item that corresponds to an undiscovered feature is selected, the user is presented with information or a tutorial that instructs the user about the feature or how to use the feature. The undiscovered features included in the ticker can change based on how the usage of the device's features changes.

3 Claims, 3 Drawing Sheets

SYSTEMS AND METHODS FOR DISCOVERING FEATURES IN A COMMUNICATION DEVICE

RELATED APPLICATIONS

Not Applicable

BACKGROUND OF THE INVENTION

1. Field of the Invention

The present invention relates generally to communications systems, methods and devices. More particularly, embodiments of the invention relate to systems and methods for discovering features on a mobile communication device using content displayed in an interactive ticker.

2. Related Technology

The popularity of the Internet has given rise to a wide variety of information services and devices as consumers have become accustomed to accessing timely, personalized news and information. As a result, demand for these types of content and services as well as the devices through which the content and services are accessed continues to grow. In addition to the growth of the content and services that can be accessed using communication devices, cellular telephones and other communication devices are becoming increasingly sophisticated and offer a wide variety of different features. Voice dialing, picture messaging, voice memo, speakerphone, and text-to-speech capabilities are examples of some of the features that are found on current communication devices.

Unfortunately, many of these features have not been discovered by users and, as a consequence, remain unused. Some users may not know, for example, that their communication device can function as a speakerphone or that they can configure their communication device to respond to voice commands. Alternatively, users may be aware of the features their devices include, but may not know how to use or activate those features.

This problem, which is referred to herein as feature discovery, has an impact on both users and on the carrier. Users, for example, are unable to fully utilize the capabilities of their communication device and do not enjoy the corresponding benefit of the unused features. The problem, from the perspective of the device carrier, is that the features are unused.

Many of these features can generate revenue for the carrier. If the features are not discovered, then revenue is not generated. In one sense, the undiscovered features of mobile communication devices translates into lost revenue for the carriers. Thus, the problem faced by both users and carriers relates to discovering the features of a communication device.

BRIEF SUMMARY OF AN EXEMPLARY EMBODIMENT OF THE INVENTION

These and other limitations are overcome by embodiments of the invention, which relate to systems and methods for discovering features of a communication device. Communication devices often include various features that can expand the versatility of the devices. As previously stated, some of the features are never used by the user for various reasons.

Embodiments of the invention enable discovery of unused features by monitoring or tracking the usage of the device's features. Features that are unused, infrequently used, or used incorrectly are identified and qualify as unused. Features that qualify as unused can then be included as ticker items in an interactive ticker. In other words, some of the ticker items correspond to features that are either unused, infrequently used, or incorrectly used. The ticker items that qualify as unused can also correspond to unused aspects of frequently used features.

As the interactive ticker is presented to the user, the user uses the navigational mechanisms of the device to select a ticker item that corresponds to an undiscovered or unused feature. When the undiscovered feature is selected, a predetermined action is taken relating to the selected feature. Instructions, a tutorial, or other information are examples of actions that are presented to the user regarding the undiscovered feature. The instructions or tutorial presented to the user instructs the user about the feature and encourages use of the feature.

In some embodiments, features of the device can be included in the ticker based on context, although this can be optional. Features that require a particular network, for instance, may not appear in the ticker unless that particular network is detected by the device. Including the feature in the ticker when the corresponding network is detected gives the user the ability to immediately use the feature while the tutorial is fresh in the user's mind. Some of the features in the ticker are based on the usage of other device features.

After a tutorial or other information is presented regarding an undiscovered feature selected from the interactive ticker, that feature is no longer included in the ticker. However, that feature can return to the ticker, for example, if the feature is not subsequently used or if the usage of the feature is infrequent or incorrect. In this manner, the user is reminded of the device's features and given opportunities to become familiar with their use in an unobtrusive manner.

These and other aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EMBODIMENTS OF THE INVENTION

Figure 1:
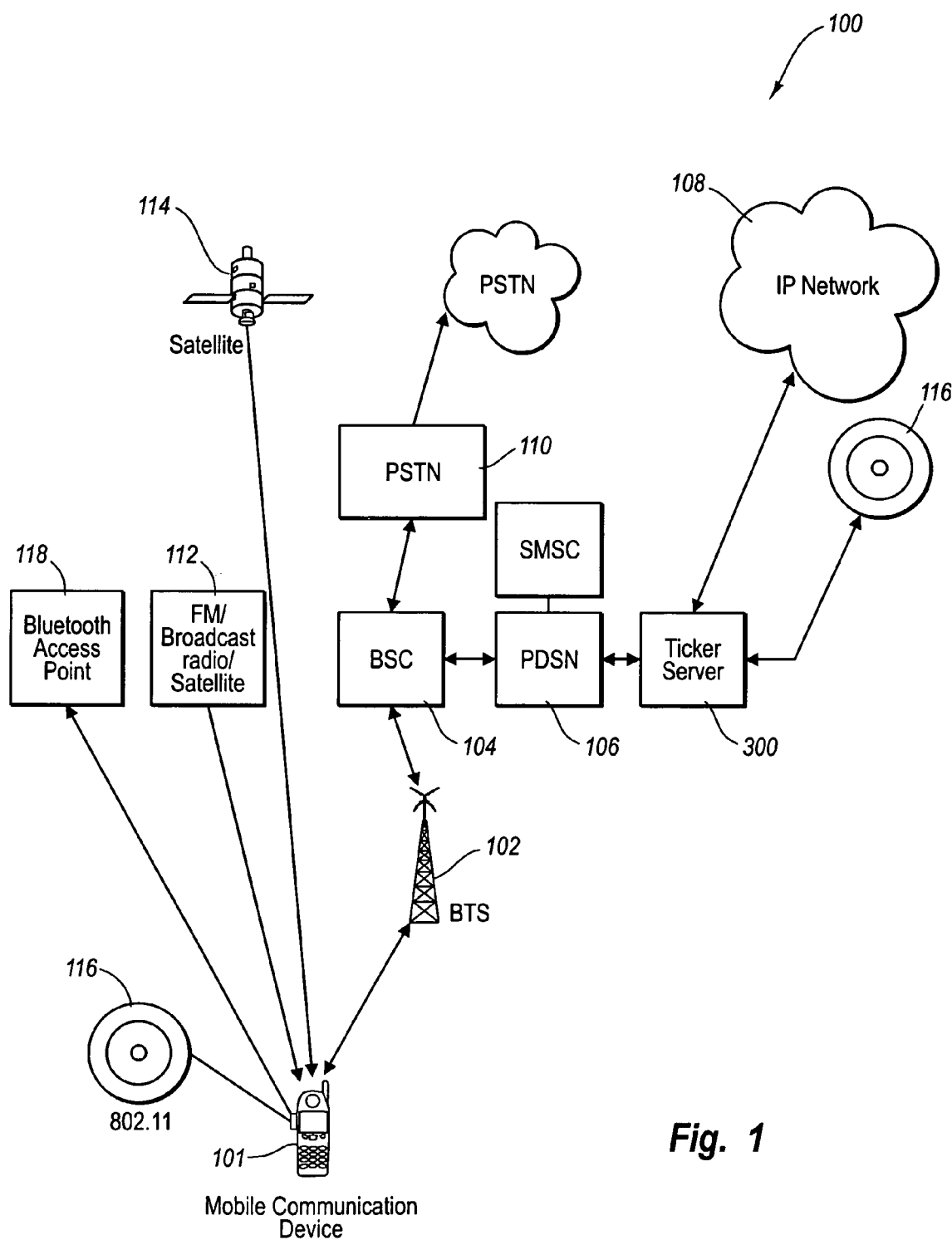
FIG. 1 is a schematic view illustrating aspects of an exemplary operating environment for embodiments of the invention.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with discovering features of a device such as a mobile communication device. Feature discovery is achieved, in one embodiment, by integrating feature discovery with the navigation and interaction of content that is transmitted to a mobile communication device and displayed within an interactive ticker on the device. Communication devices that may be employed in conjunction with the invention include set top boxes, cellular telephones, PDAs, "smart phones" and any other device having an associated display device and suitably equipped to establish communication with a network. Features of a device include, but are not limited to, broadband access, picture messaging, text messaging, text to speech, voice dialing, speakerphone, abbreviated dialing, active dialing, calendaring, security, voice memo, quick dial, data synchronization, data transfer, as well as other existing features, and the like or any combination thereof. Embodiments of the invention can also accommodate new features.

As used herein, the term "ticker" refers to a portion of a display screen on a communication device in which information is dynamically displayed. The ticker should not be construed to be limited to a scrolling information display at the bottom of the screen, rather, the ticker can take many shapes and forms, and the location of the ticker on the screen as well as many other ticker characteristics can be customized to suit the needs and preferences of the user.

More specifically, embodiments of the invention provide for discovering features of a device using content displayed on an interactive ticker of a communication device. The content displayed within the interactive ticker may also be referred to herein as "ticker item(s)". In other words, the ticker items in the interactive ticker correspond to content and some of them correspond to features of the communication device. In this manner, features of the communication device are presented to the user in an interactive ticker on the display of the communication device. Using keys on a keypad of the communication device or on a remote control device associated with the communication device, device soft keys, other device buttons and wheels, voice commands, or by moving the device in a particular way, such as shaking it, turning it from side to side or upside down, or otherwise moving the device (for convenience, these navigation mechanisms are hereinafter referred to collectively as "ticker navigation mechanism(s)"), the device user is able to interact with the content displayed within the ticker whether or not the device has an active network connection. Content received into the ticker of the communication device can include many different types of media, such as text, audio, and video that is transmitted to the device over a network, as well as content received into the ticker from local applications resident on the device.

Using one or more of the aforementioned ticker navigation mechanisms, the user can perform a variety of actions on the ticker items, including changing the speed with which the ticker scrolls, highlighting and/or selecting ticker items, scrolling forward, scrolling backward, pausing the ticker, scrolling to the next or previous item, scrolling to the next or previous category of information, deleting ticker items and otherwise navigating and interacting with the content displayed in the ticker. In some cases, navigating to a ticker item and selecting it using a ticker navigation mechanism causes a secondary action to be performed, such as presenting supplemental information that expands on the subject of the ticker item, launching an application resident on the communication device, causing additional content, applications, or services to be downloaded to the communication device or accessed by the communication device, or causing any of a number of other actions to be performed.

The ticker itself may take many forms and shapes, and its location on the display screen as well as many other characteristics of the ticker and the ticker items are customizable by the user. In one example, the user may have configured the ticker to scroll across the bottom of the display on the communication device. In another, the ticker may appear at the top of the display screen. The appearance of the ticker, such as its shape, the background color, the degree of transparency and fonts used, as well as notification mechanisms and many other attributes may be further customized by the user.

In the exemplary embodiment, a user has a mobile communication device that is suitably equipped to receive data using for example, a cellular network, the short message service (SMS), the 802.11 family of wireless local area networks (WLAN), a Bluetooth network, satellite and terrestrial broadcast networks or any other type of network, combination of networks, or network connections to which the mobile communication device can connect and receive data transmissions. These data transmission modes are also referred to herein as "bearers". While the methods of the invention are particularly well-suited to mobile devices, they should not be construed to be limited to mobile devices. The ticker navigation mechanisms of the invention may also be used in conjunction with a set top box, for example.

Returning to the exemplary embodiment, the mobile device is also equipped with ticker client software that enables an interactive ticker to be rendered on the display of the mobile device. The ticker client software may further communicate with a ticker server to receive content that has been aggregated from multiple content providers and is then provided to the interactive ticker on the mobile device based on certain considerations.

The ticker client software (or other module on the device or on a remote server) monitors the usage of the device's features. The ticker client software identifies or tracks those features of the device have been used and those that have not been used. Features that have not been used or that have been used infrequently or incorrectly can be classified as content that corresponds to ticker items in the interactive ticker. When the user selects a ticker item that corresponds to a particular feature from the ticker, the device or the ticker client software may launch a tutorial, for example, that gives step by step instructions for using or activating a selected feature. The tutorial may guide the user through an actual use of the feature or simulate a use of the selected feature. Advantageously, including features of a device as ticker items reminds users of the features of their devices in an unobtrusive way and are gives users the opportunity to learn to use those features without having to consult the device's manual.

Content may be provided to the interactive ticker on the device from multiple content sources and using any of a number of bearers with which the device is equipped to communicate. Furthermore, multiple content delivery mechanisms, such as MMS, RSS, email, and many other content delivery mechanisms that operate in conjunction with a bearer are supported by the ticker. Ticker client software may communicate with a ticker server to receive content, exchange other types of data and execute navigation commands. The communication with the ticker server may also relate to how the user has used the features of his or her communication device. Thus, the content received from any of a number of bearers can be related to enabling a user to discover features of their device.

Furthermore, the manner in which the transmitted data and the device features are displayed can include a wide variety of content presentation attributes, including the shape, size, speed and location on the display screen of the interactive ticker, multiple font effects, and audible or tactile notifications indicating that new content has arrived at the ticker, all of which are customizable by the device user utilizing the ticker navigation mechanisms of the invention.

Operating Environments and Associated Devices

With particular attention now to FIG. 1, one exemplary implementation of an operating environment, denoted generally at 100, is indicated. Although this exemplary operating environment comprises multiple types of networks, including a cellular telephone network, 802.11 networks, Bluetooth access points, and broadcast networks such as FM radio or satellite radio, the invention may be employed in connection with any other type of network and associated landline or wireless communication devices that are effective in implementing or facilitating communication.

While FIG. 1 depicts a cellular telephone and exemplary embodiments are directed to the use of cellular telephones in conjunction with the invention, the invention should not be construed to be limited to such devices. As previously noted, many types of communication devices are available and are suitable for use in conjunction with the invention, including set top boxes, cellular telephones, PDAs, smart phones, and many other devices suitably equipped to establish communication with a network and having a display device such as a display screen may be used to implement the methods of the invention. Accordingly, the scope of the invention should not be construed to be limited to the exemplary operating environment indicated in FIG. 1.

In the exemplary illustrated embodiment, the operating environment 100 includes one or more mobile communication devices 101 (also referred to herein as "mobile device(s)" and "the device") configured to communicate with one or more networks and/or network elements, including base transceiver station (BTS) 102 of the cellular network, internet protocol (IP) network 108, FM or satellite radio broadcast network 112, 802.11 wireless access points 116, and Bluetooth access point 118. One or more of these network elements or bearers may be used to transmit content to the interactive ticker depending on the configuration of the mobile device. Mobile communication device 101 is further configured with ticker client software that enables it, among other things, to communicate with ticker server 300 that may be embodied, in one implementation, as a server operating in conjunction with IP network 108. Ticker server 300 may further interface with other network elements, such as a Short Message Service Center (SMSC) and various gateways to implement the methods of the invention.

Displaying Features in the Interactive Ticker

Figure 2:
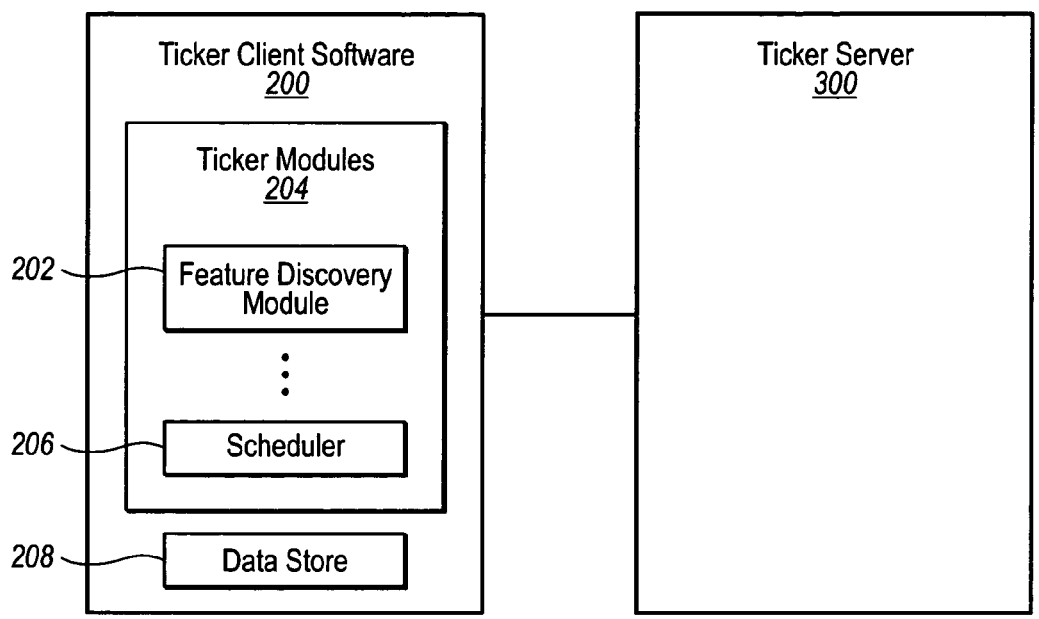
FIG. 2 illustrates exemplary aspects of ticker client software.

Directing attention now to FIG. 2, details are provided concerning an example of ticker client software 200. Ticker client software 200 resides on the mobile communication devices used in conjunction with the invention. In one embodiment, ticker client software 200 is installed on mobile communication device 101, which is suitably equipped to establish a connection with one or more networks and send and receive data. Ticker client software 200 may operate in conjunction with a ticker server 300.

Ticker client software 200 includes ticker modules 204. The ticker modules include, in this example, a feature discovery module 202 and a scheduler 206. Additional details regarding tickers displayed on mobile devices are included in U.S. patent application Ser. No. 10/916,960, filed Aug. 11, 2004, which is incorporated herein by reference. The feature discovery module 202 can operate exclusively on the mobile communication device 101 or in conjunction with the ticker server 300 or operate independently of the mobile communication device 101 on the ticker server 300.

In each case, the feature discovery module 202 monitors usage of the features of the mobile communication device 101. By monitoring or detecting the usage of the device's features, the feature discovery module 202 can identify which features of the mobile communication device 101 have been used and which features have not been used. Thus, the feature discovery module 202 can track or monitor the usage of various features on the communication device 101.

The feature discovery module 202 can also track the usage of particular aspects of a feature. For example, many devices have the ability to send and receive text messages. Many users, however, may not be aware that the text of a text message can be created in different ways. Text can be created, for example, by simply pressing the device keys until the appropriate letters appear (pressing the number 2 key three times, for example, results in the letter "c"). Many devices also have the ability to "guess" what the user is entering as text. Rather than repeatedly pressing a single key until the appropriate letter appears, the user presses keys as if spelling a word. The device then makes guess as to what word is being spelled.

In this example, the feature discovery module 202 can identify that a user may only use a particular mode of entering text when performing text messaging. With this knowledge, the ticker client software 200 may cause another mode of entering text to be included as a ticker item. In this manner, the feature discovery module 202 can track and identify not only which features have not been used, but also identify unused aspects of frequently used features.

The mobile communication device 101 includes a data store 208 that can store the data that describes feature usage on the device 101. Once the feature usage data is received into the data store 208, the scheduler module 206 determines the times at which the stored feature usage data is displayed relative to all of the content received and scheduled for display within the interactive ticker. For example, the scheduler module 206 may include an unused feature in the interactive ticker at various times along with other ticker items that correspond to other content.

The ticker client software 200 or the scheduler module 206 uses the information collected or identified by the feature discovery module 202 to insert ticker items that correspond to features of the device 101 into the ticker. Typically, unused features are included in the ticker while features that the user is familiar with are not necessarily included in the ticker. The features are included with other content that is made available to the ticker client software 200.

When a feature is selected from the ticker using the navigation mechanisms of the device 101, the feature discovery module 202 may present the user with instructions or a tutorial on using the feature. The instructions or the tutorial do not need to be stored on the device 101. The instructions or tutorial can be located on the ticker server 300 and served to the device as successive screens of the tutorial are selected by the user.

The instructions or tutorial for the selected feature can be graphical and/or textual in nature. If the feature selected from the ticker is subsequently used by the user, this information is reflected by the feature discovery module 202 in the feature usage data. Once a user has discovered a feature and used the feature, there is no longer a need to remind the user about the feature and the ticker can be dedicated to other content. If, however, a feature is unused for some period of time, then the feature discovery module 202 may cause the feature to reappear in the interactive ticker. As a result, the features presented in the ticker are those that the user has either not used, has used infrequently, or has used incorrectly.

Ticker Use and Interaction

With continuing reference to FIG. 2, as has been previously noted, the ticker of ticker client software 200 is interactive. The ticker client software 200 enables and controls the various ticker navigation mechanisms that may be employed by the device user to interact with user interface elements of the ticker client software and to interact with ticker items. Moreover, user interaction with a ticker item, such as by clicking on the item, scrolling to it, highlighting it or otherwise selecting the item, can cause a secondary action.

In one example, a URI associated with the ticker item is launched when the user selects the item, such as by clicking on the item or otherwise selecting the item, resulting in display of a web page containing additional content about the item. For a feature of the communication device, a web page including information and instructions regarding the selected feature may be displayed to the user. As previously indicated, the instructions or related information may already be stored on the device or can be supplemented by a remote server or other content provider.

For example, if the selected ticker item corresponds to a feature for setting a background image for the device interface, the tutorial may teach the user how the background can be set to a different image. The tutorial can be stored on the device itself and/or on a remote server. Thus, selecting this ticker item may cause the device to access the tutorial over a network. At the same time, the user may be directed to a web site during the tutorial where additional background images are available for download. The instructions for setting the background may already be on the device, but the ability to purchase other background images require a network connection.

Including features of the device in the ticker can also be related to outside factors. For example, a device may have a feature of being able to connect with Bluetooth or other networks and the feature discovery module 202 may detect that the user has not used this feature. In one embodiment, the scheduler may only insert this feature into the ticker when the mobile communication device detects such a network. If the feature relates to accessing a Bluetooth network, then the tutorial can be presented while taking advantage of the detected Bluetooth network. This has the advantage of providing instructions that can be implemented in an active network.

Figure 3:
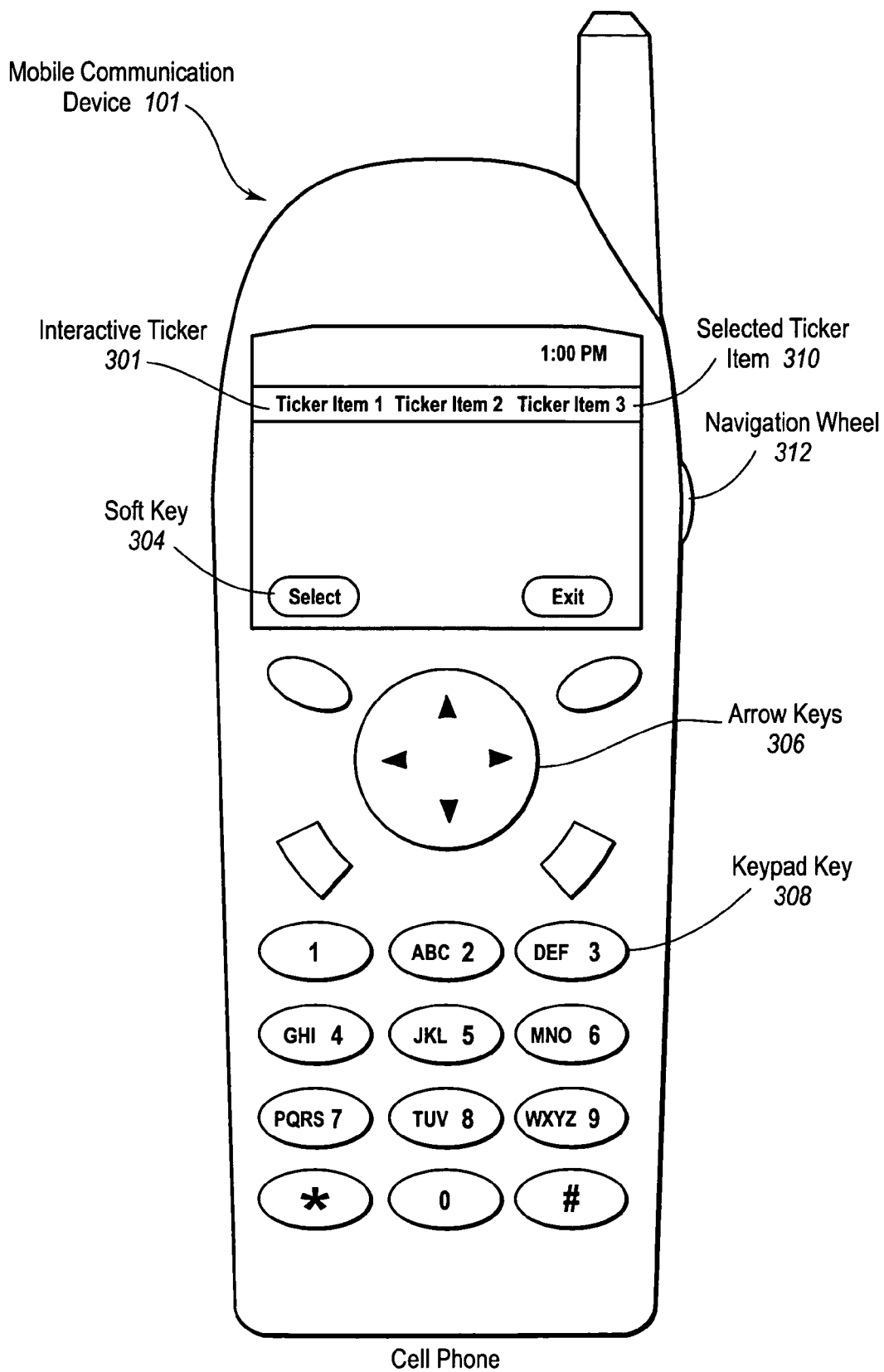
FIG. 3 is a schematic view illustrating examples of ticker navigation mechanisms on a mobile communication device.

Turning now to FIG. 3, a schematic diagram of a mobile communication device 101 and example ticker navigation mechanisms is shown. In this example, the interactive ticker 301 is positioned at the top of the display of the mobile communication device. As previously discussed, the location, shape and size of the ticker are all configurable by the user. Ticker items that populate the interactive ticker scroll from right to left, although the user may change this ticker attribute and other ticker attributes, such as the default speed at which items scroll. The user may also use arrow keys 306 to scroll right or left and to scroll at a faster rate. Holding the arrow key down may cause the ticker to pause on a certain ticker item. Alternatively, navigation wheel 312 or a similar navigation device may be used to scroll through ticker items.

In the example in FIG. 3, ticker item #3 has been paused. Using soft key 304, the user may select ticker item #3 which can cause a secondary action to occur, such as displaying additional details about the topic of ticker item #3 to the user, invoking a local application, downloading other supplemental information or downloading software. When the user no longer wishes to view ticker item #3, a ticker navigation mechanism, such as keypad key 308 may be used to delete the ticker item from the ticker.

In this example, the ticker item #3 corresponds to a feature of the device 101 that has not been used by the user. Including the feature as ticker item #3 is an unobtrusive way to alert the user to the undiscovered features or aspects of features of the device 101. The frequency with which a feature is included as a ticker item can be set by default or set by a user. The particular features that are included in the ticker 301 can also be determined by identifying which bearers are available to the device 101 at a given time. Features related, for example, to web browsing, picture messaging, email, and the like may only be included in the ticker when a corresponding network is available. Of course, these features can be displayed in the ticker at times when a corresponding network is not available and a user can learn to use these features even when a network is not present.

The specific features included in the ticker 301 as ticker items can also depend on the features that are actually used by the user. For example, for a user that frequently sends text messages, the ticker client software may include the picture messaging feature of the device 101 in the ticker. A user that frequently takes pictures with the device 101 but does not use picture messaging may also notice that picture messaging and/or email are some of the features included as ticker items in the ticker 301.

Including the features in the ticker facilitates the discovery process for several reasons. A user that actively selects a ticker item is expressing interest in learning about the feature. The tutorial launched by the selection of the feature is crafted for that specific feature. At the same time, a user that does not want to learn about the feature can simply choose to not select the associated ticker item, but the user is still made aware the feature exists and may come back to it at some time in the future. In this manner, the discovery of features does not interrupt the usage of the communication device while still providing the opportunity to discover new features.

Figure 4:
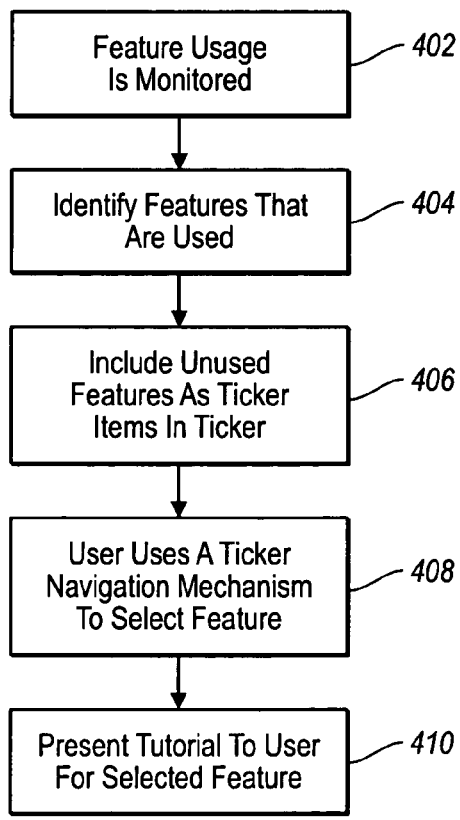
FIG. 4 is a flow chart illustrating an exemplary method for discovering features of a-device using an interactive ticker.

FIG. 4 illustrates an example of a method for discovering features of a device such as a mobile communication device. At step 402, the ticker client software of the device is monitoring and tracking the usage of the features of the device. This can include identifying how often a feature is used as well as when the features are used. Monitoring the usage of the features of the device can also have different granularities. Feature usage can be monitored, for example, on a feature basis and/or on specific aspects of various features.

At step 404, the device or the ticker client software identifies features that are unused. Identifying unused features may also include identifying features that the user has used infrequently or that the user has used incorrectly. Identifying unused features can also include identifying unused aspects of features that are frequently used. There is a description related to each unused feature. At step 406, the ticker client software maps some or all of the unused features to descriptions and tutorials for those features. The descriptions are included in the interactive ticker as ticker items. As the ticker scrolls on the screen of the device, unselected ticker items can be automatically deleted or removed such that other content can be displayed in the ticker. Over time, all of the unused features are presented to the user in the interactive ticker. In this manner, the device can periodically include ticker items that correspond to various features. The ticker client software can control the order and frequency with which features of the device are included as ticker items. Some features may occur more frequently in the ticker than other features. This selection, mapping, and frequency of the display process can be controlled locally or by using data that comes from a server. This allows the operator of the mobile service to, for example, control which features are displayed in the ticker and the details of the tutorial regarding how to use those features.

At step 408, a user uses ticker navigation mechanisms to select a ticker item that corresponds to an unused feature. At step 410, information relating to the selected feature is presented to the user. The information can include an advertisement, a description of the selected feature, and the like. In one embodiment, the information is a tutorial which is presented to the user for the selected ticker item/feature. This tutorial can take any number of forms, such as text, video, WAP page, MMS, audio walk-through, or other means of communicating with the user. If the tutorial is completed, this can be noted by the feature discovery module and taken into account for future use. If the user does not subsequently use the selected feature, then the device may afford the user another opportunity to learn about the feature through the interactive ticker. As the user discovers features of their device, the discovered features may not be included in the ticker as ticker items.

In some instances, a user may discover a feature without viewing the tutorial or without selecting a ticker item from the interactive ticker. The feature discovery module, however, tracks the usage of this feature and updates the storage accordingly such that the ticker does not include unnecessary ticker items. In this manner, the display of undiscovered features is focused on those features that the user has not used.

In some instances, a user may not complete a particular tutorial. In this case, the associated feature may still be included with other features that are displayed in the ticker. If the user actually uses that feature at a later time without completing the tutorial, then the feature may be considered discovered and be removed from being displayed in the ticker.

Telecommunication Devices and Computing Environments

Embodiments of the present invention may be implemented in connection with a special purpose or general purpose telecommunications device, including wireless telephones and other telephony-enabled wireless devices, landline telephones, or special purpose or general purpose computers that are adapted to have telecommunications or data networking capabilities such as cable set top boxes or PCs. Embodiments within the scope of the present invention also include computer-readable media for carrying or having computer-executable instructions or electronic content structures stored thereon, and these terms are defined to extend to any such media or instructions that are used with telecommunications devices.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

I claim:

1. A method for discovering features on a communications device, the method comprising:
    monitoring features on a communication device to identify a feature that is not used by a user;
    including the identified feature as a ticker item in a ticker displayed on the communication device;
    presenting information relating to the identified feature on the communication device when the identified feature is selected from the ticker by the user, wherein presenting information relating to the identified feature on the communication device comprises:
        presenting a tutorial regarding the identified feature; and
        accessing the tutorial from at least one of the communication device and a
    remote server;
    monitoring the identified feature to determine whether the identified feature is used after presenting the tutorial; and
    including the identified feature as a ticker item in the ticker if the feature is not used after a specfied period of time.

2. The method of claim 1, wherein the identified feature comprises a picture messaging feature.

3. The method of claim 1, wherein the identifed feature comprises a text message feature.

* * * * *

UNITED STATES PATENT AND TRADEMARK OFFICE
CERTIFICATE OF CORRECTION

PATENT NO. : 7,580,702 B2 Page 1 of 1
APPLICATION NO. : 11/129152
DATED : August 25, 2009
INVENTOR(S) : Othmer It is certified that error appears in the above-identified patent and that said Letters Patent is hereby corrected as shown below:

IN THE CLAIMS

In Column 10, Line 33, in Claim 1, delete "communications" and insert -- communication --, therefor.

In Column 10, Line 47, in Claim 1, delete "remote server;" and insert the same in line 46, after "device and a" as a continuation.

In Column 10, Line 52, in Claim 1, delete "specfied" and insert -- specified --, therefor.

In Column 10, Line 55, in Claim 3, delete "identifed" and insert -- identified --, therefor.

In Column 10, Line 56, in Claim 3, delete "message" and insert -- messaging --, therefor.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,580,702 B2 | Page 1 of 1 |
| APPLICATION NO. | : 11/129152 | |
| DATED | : August 25, 2009 | |
| INVENTOR(S) | : Konstantin Othmer | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Fourteenth Day of September, 2010

David J. Kappos
*Director of the United States Patent and Trademark Office*